United States Patent Office 3,429,863
Patented Feb. 25, 1969

3,429,863
ELASTOMERIC POLYMER
Yung-Kang Wei, Sarnia, Ontario, Canada, assignor to Polymer Corporation Limited, Sarnia, Ontario, Canada, a body corporate and politic
No Drawing. Filed July 12, 1965, Ser. No. 471,387
Claims priority, application Canada, July 23, 1964, 907,902
U.S. Cl. 260—94.3
Int. Cl. C08d 3/06, 1/14
11 Claims

ABSTRACT OF THE DISCLOSURE

A substantially gel-free polymer of butadiene-1,3 is produced in the presence of a catalyst system consisting of a lithium hydrocarbon and a halide of tetravalent titanium mixed in a molar ratio from 8:1 to 16:1.

The polymer has less than 25% of butadiene units in the 1,2 structure, between 25 and 40% in the cis-1,4 structure and the remainder is in the trans-1,4 configuration. It has a molecular weight which corresponds to an intrinsic viscosity of 1.0 to 3.0 dl./g. and a Mooney viscosity of not less than the Mooney viscosity defined by equation Mooney=$5.6[\eta]^{2.6}$ where $[\eta]$ is the intrinsic viscosity measured in toluene at 30° C. The polymer is resistant to cold flow and shows improved processability.

---

This invention relates to the polymerization of a conjugated diolefin and, in particular, butadiene-1,3 in the presence of a lithium catalyst to produce an improved elastomeric polymer of butadiene.

The use of a lithium catalyst in the polymerization of conjugated diolefin is well known. When used in the polymerization of isoprene in the absence of oxygen and oxygen-containing compounds, it produces a high cis-1,4 polymer which is very similar to the natural rubber of the Hevea Brasiliensis type. Butadiene-1,3 polymerizes under the same conditions to form a polymer which has a mixed microstructure of the butadiene units of about 35% cis-1,4, 55% trans-1,4 and 10% 1,2 content. Such polymer is linear and has a narrow molecular weight distribution. It has good physical properties which in some respects are better than those of natural rubber. However, it is highly deficient in processability on rubber processing equipment. Various attempts have been made to alleviate the problem of processability. A certain improvement may be achieved by reducing the molecular weight of the polymer unfortunately at the expense of dimensional stability of the raw rubber and physical properties of the vulcanized material. Small amounts of polyfunctional comonomers such as divinyl benzene copolymerized with butadiene are also known to improve the processability and dimensional stability, i.e., resistance to cold flow.

It has now been found that the lithium catalyst which is modified by a small amount of a halide of a tetravalent titanium produces a polybutadiene having a reduced tendency to cold flow and improved processability. This effect is surprising and unexpected since a catalyst containing titanium halide such as $TiI_4$ is known to produce a polybutadiene which is not free of the cold flow phenomenon at conventional Mooney viscosities. The object of the invention is to provide a process of polymerizing butadiene-1,3 using a lithium catalyst to produce a polymer having improved processability. Another object is to provide a homopolymer of butadiene-1,3 having a reduced cold flow tendency and an improved processability.

The objects of the invention have been achieved in a process of producing a rubbery polymer of butadiene-1,3 having less than 25% of the butadiene units in the 1,2 structure, which comprises contacting butadiene-1,3 with a polymerization catalyst formed by admixing a lithium component and a halide of tetravalent, the molar ratio of lithium to titanium in the catalyst being at least 5:1. In one of the specific aspects of the invention, the objects have been achieved in the process of producing a substantially gel-free rubbery polybutadiene having less than 25% of the butadiene units in the 1,2 structure and at least 25% of the units in the cis-1,4 configuration which comprises contacting in the presence of a hydrocarbon diluent butadiene-1,3 at a temperature 0–70° C. with a polymerization catalyst formed by admixing a lithium hydrocarbon containing 1–12 carbon atoms and a titanium trichloro-monoiodide, the molar ratio of lithium to titanium in said catalyst being 8:1 to 16:1.

The catalyst which is used in accordance with the invention comprises a mixture of a lithium component and a compound of titanium. The lithium component may be a metallic lithium, lithium hydride or a lithium hydrocarbon compound. In the process of polymerizing, it is believed that metallic lithium or lithium hydride reacts with butadiene and forms a butadienyl lithium compound. The lithium hydrocarbon may be represented by the formula $RLi_x$ in which R is a monovalent or polyvalent hydrocarbon radical and $x$ is a number from 1 to 3. The size and the type of hydrocarbon radical is not critical and it may be an aliphatic or aromatic radical containing 1–12, preferably 2–8, carbon atoms. Representative examples of the lithium hydrocarbons are ethyl lithium, butyl lithium, hexyl lithium, allyl lithium, butadienyl lithium, vinyl lithium, tolyl lithium, naphthyl lithium, dilithium naphthalene, and dilithium butadiene. Alkyl lithium compounds are preferred. Mixtures of two or more lithium hydrocarbon compounds can also be used.

The titanium compound is a hydrocarbon soluble halide of a tetravalent titanium in which at least three valencies of the titanium atom are occupied by the same or different halogen atoms such as chlorine, bromine, iodine. One of the valencies may be also satisfied by a monovalent organic substituent such as an alkoxy, phenoxy, amino or thiohydrocarbon radical. Representative examples of the titanium halides are titanium tetrachloride, titanium tetrabromine, titanium tetraiodide, titanium trichloromonoiodide, titanium dibromodichloride, titanium trichloro monoethoxide, titanium triiodo monobutoxide. Tetrahalides are preferred and for best results it is most preferred to use a mixed halide of titanium such as trichloromonoiodide or a mixture of titanium tetrahalides.

The molar proportion of the lithium component to the titanium compound in the mixed catalyst is at least 5:1. The catalyst having less than 5 moles of lithium per one mole of titanium shows a reduced activity or produces a polymer having a predominantly cis-1,4 configuration. The upper limit of the lithium to titanium ratio is not critical and the ratio of up to 30:1 can be used. It is preferred to control the molar ratio of lithium to titanium at 8:1 to 16:1 and for best results a ratio of about 10:1 to 12:1 is most preferred.

The catalyst of this invention may be preformed by mixing the components in the presence of a diluent and then adding the mixture to butadiene-1,3. It also may be formed in the presence of butadiene monomer by adding the lithium component first, quickly followed by the titanium compound, or vice versa, by adding the titanium compound first and then following with the lithium component. In a continuous polymerization system, it is preferable for flexibility to add all the catalyst components simultaneously, via separate lines so that the proportion of the components may be varied as desired.

The catalyst is soluble or colloidally dispersible in hydrocarbon diluents so that it is easily handled, even in the preformed form. The total amount of catalyst which is required to effect polymerization may be readily determined by those skilled in the art. It usually varies between .1 and 10% based on the monomer weight depending on the particular conditions such as temperature, impurities, amount and the type of diluent. The polymerization may be carried out over a wide range of temperatures varying from about −25° C. to about 100° C., although temperatures outside this range can be used without departing from the scope of the invention. The preferred operating range is between 0° C. and 70° C.

Butadiene-1,3 or a mixture of a major proportion of butadiene-1,3 with a minor proportion of a copolymerizable olefinically unsaturated hydrocarbon may be dispersed in a non-reactive organic liquid containing 1–10 carbon atoms. It is preferred to use as the non-reactive diluent a low boiling hydrocarbon solvent, such as pentane, heptane, cyclohexane, benzene or toluene. The solvent should be free of compounds which inactivate the catalyst such as water or alcohol. The amount of the non-reactive diluent may vary within wide limits, although it is preferable to use an amount such that the viscosity of the reaction system permits ready mixing and heat exchange. The preferred amount of the diluent is 1 to 10 volumes per 1 volume of butadiene-1,3. However, from the point of view of the product obtained, the diluent is not essential and it is possible to operate in the complete absence of diluent in which case monomeric butadiene-1,3 or a mixture of butadiene-1,3 with comonomer acts as the reaction medium. If, on the other hand, a highly diluted polymer solution or dispersion is desired, polymerization systems may be used which contain more than 10 volumes of the diluent per 1 volume of butadiene-1,3.

The polymerization system may also contain, if desired for control of molecular weight or microstructure of butadiene polymer, a small amount of an organic compound capable of complexing the lithium component. The compound should be free of groups which react with and deactivate lithium hydrocarbon such as hydroxyl groups in alcohols phenols or acids, aldehyde, primary and secondary amine. The compound is a polar organic liquid selected from aliphatic, cycloaliphatic, aromatic or heterocyclic ethers, tertiary amines, ketones and hydrocarbyl halides. It is preferred to use the polar compound containing less than 12 carbon atoms. Representative examples of the polar compound which can be used in accordance with the invention are diethyl ether, diisopropyl ether, methyl phenyl ether, tetrahydrofuran, triethyl amine, pyridine, acetone, methyl ethyl ketone, methyl iodide, butyl chloride, bromobenzene. The amount of the polar compound must be less than 1 mole per mole of lithium compound and preferably, it is less than 0.5 mole per mole of lithium.

In accordance with the invention, butadiene-1,3 can be homopolymerized or copolymerized with a minor proportion of a copolymerizable olefinically unsaturated hydrocarbons. The copolymerizable hydrocarbon is preferably a vinyl compound of the $CH_2=CHR$ type where R is hydrogen or an alkyl, cycloalkyl, or aryl radical. Ethylene, propylene, butene, hexene, vinyl cyclohexane, styrene, isoprene are the examples of the copolymerizable hydrocarbons. Hydrocarbons containing two or more non-conjugated double bonds or other independently polymerizable groups are not included. Styrene is the most preferred comonomer. Not more than 25% by weight of butadiene-1,3 of the comonomer is used in the polymerization if the advantages of the process of this invention are to be realized.

The polymer which is obtained according to the process of this invention is a substantially gel-free rubbery homopolymer or copolymer of butadiene-1,3. The butadiene units in the polymer are linked in a similar manner as in the polybutadiene prepared in the absence of the titanium compound, that is, the 1,2 content is less than 25% preferably less than 15%, and the units in the 1,4 structure are divided between two configurations, the cis-1,4 and the trans-1,4 configuration. The cis-1,4 content is at least 25% and may vary between 25 and 40% and the remainder of the units are in the trans-1,4 configuration, that is, about 45 to 60%. The microstructure of butadiene units is not affected by comonomer such as styrene present in the polymer. The butadiene-1,3 and styrene copolymer appears to have styrene units randomly distributed along the polymeric chains.

In contrast to the linear polymer which is produced in the absence of titanium compound, the polymers of this invention are believed to be branched. The presence of branches. The presence of branches in the polymer can be inferred from the following properties: (1) a reduced tendency to cold flow, (2) an increased Mooney viscosity at a given intrinsic viscosity, and (3) a reduced $\alpha$ value in the Mark-Houwink equation $[\eta]=KM\alpha$. The cold flow phenomenon is related to the ability of individual polymer molecules to move or slip with respect to each other. It may be stopped or reduced by crosslinking (chemical immobilization of molecules), crystallization (physical immobilization) or increased entanglement of individual molecules. The last effect may be achieved by either of the two methods: (i) increasing the average molecular weight of molecules or (ii) branching of linear molecules. The polybutadiene of this invention is substantially gel-free and hydrocarbon soluble, and amorphorus, that is, free of chemical or physical means of immobilization. It practically does not show any tendency to cold flow at an intrinsic viscosity of 1.7 deciliters/gram (dl./g.) which corresponds to a Mooney viscosity (ML–4–100° C.) of about 27, both the viscosities being lower than those at which the prior art polybutadiene is still flowable, that is, $[\eta]$ of 2.5 and Mooney of 45. The polymer of this invention is characterized by a high Mooney viscosity for a given intrinsic viscosity and in that respect is similar to branched polymers such as produced in the free radical type polymerization. The relationship between the two viscosities may be represented by the empirical equation:

$$\text{Mooney (ML-4-100° C.)} = (7.3 \pm 1.7)[\eta]^{2.6}$$

where $[\eta]$ is the intrinsic viscosity measured at 30° C. in toluene. Polymers of this invention have a Mooney viscosity which is higher than $5.6\,[\eta]^{2.6}$, whereas the lithium catalyzed polybutadienes of the prior art show a lower Mooney viscosity which is defined by the equation $$\text{Mooney (ML-4-100° C.)} = 2.29[\eta]^{3.26}$$

According to the above equation, at an intrinsic viscosity of 1.5 dl./g. the linear polybutadiene has a Mooney of 8, whereas the branched polymer of this invention has a Mooney of at least 15, usually about 20; and at $[\eta]=2.5$, the linear polymer has a Mooney of 45, whereas the branched polybutadiene of this invention has a Mooney of at least 60, usually about 80.

The mechanism of branching reaction in the polymerization process is not yet known. It is speculated that the titanium compound present in the lithium catalyst in an amount insufficient to change the stereospecificity of the lithium catalyst somehow participates in the transfer of growing chain leading to branching.

In addition to being more resistant to cold flow, butadiene-1,3 polymer of this invention shows an improved processability in rubber processing equipment. It requires blending with only half as much natural rubber as the linear polybutadiene to be millable on a rubber mill at the usual temperatures of milling and usual carbon black loadings. It shows a fair adhesion to mill roll and a good cohesion so it may be satisfactorily compounded with less rubber processing oil than normally required by a linear polybutadiene prepared in the presence of a lithium catalyst.

In order to illustrate the invention in greater detail, the following examples are shown which describe specific embodiments of the process and demonstrate the advantages of the products of this invention.

The polymerization experiments were carried out in 7-ounce or 30-ounce crown capped pressure bottles which had previously been dried at 105° C. in an oven, and flushed with dry nitrogen. The bottles, filled with nitrogen, were then capped and the reaction ingredients injected against nitrogen pressure by a syringe provided with a hypodermic needle inserted through a self-sealing rubber gasket. When larger polymer samples were required for physical tests, a 2-litre glass reactor equipped with a turbine agitator, 4 baffles and a cooling coil was used. The components of the reactor, the glass bowl and the stainless steel top were dried at 105° C. in an oven, assembled and cooled with a slow stream of dry nitrogen passing through the reactor, then rinsed with a dilute solution of butyl lithium, followed with dry benzene. The ingredients of the polymerization reaction were charged by volume, pressurized through a charging line or injected by a syringe through a self-sealing gasket.

The diluents, benzene or heptane, were dried by storing them over alumina and molecular sieves for a prolonged period of time (at least 48 hours). Butadiene-1,3 having a purity of about 99.4% was dried by consecutively passing it in liquid phase through the beds of alumina and then molecular sieves. The catalyst components were added separately as dilute solutions in benzene or n-heptane; butyl lithium solution was 1.0 molar, titanium halides 0.1 molar, except for the titanium tetraiodide solution which was 0.02 molar. Polar additives were charged in the form of 0.2 molar solutions in benzene.

Structural analysis of the polymers was determined by means of infra-red spectrophotometry. The analyses were based on the assumption that the polymers contain one unsaturated bond for each butadiene-1,3 monomer unit, and they are reported as cis-1,4, trans-1,4 and 1,2 content.

Mooney viscosities (ML–4–100° C.) referred to in this specification were determined as described in ASTM–D–1646–61 and represent the readings obtained using the large rotor after four minutes of running time at 100° C.

Intrinsic viscosities [η] were determined at 30° C. in toluene and expressed in deciliters per gram. Both viscosity terms and the method of designating viscosity values of rubbery polymers are widely used and understood throughout the industry.

EXAMPLE I

Butadiene-1,3 was polymerized in 30 oz. crown capped bottles in the presence of n-butyl lithium and titanium tetraiodide. The following polymerization recipe was used:

Benzene _____ 300 milliliters.
Butadiene _____ 120–190 milliliters (variable).
n-Butyl lithium _____ 2–3 millimoles (variable).
Titanium tetraiodide ___ 0.1–0.3 millimoles (variable).

The ingredients were charged in the order shown. After the addition of the last ingredient, the bottles were double-capped and placed on a laboratory shaker. The temperature of the bottle contents increased from 25° C. to about 50° C. for a short period of time as the polymerization proceeded and then decreased to the ambient temperature of 25° C. After 16 hours the polymerization reaction was stopped by the injection of about 20 milliliters of ethanol. The contents of the bottles were next transferred to a flask in which the polymer was precipitated with about 300 milliliters of ethanol containing 1% by weight of di-tertiary butyl p-cresol. The polymer was then dried under vacuum at 40° C. and the yield calculated. The results are shown in Table I.

TABLE I

| Bottle No. | 1 | 2 | 3 | 4 (Control) |
|---|---|---|---|---|
| Liquid butadiene (milliliter at 20° C.) | 150 | 150 | 120 | 190 |
| BuLi (millimole) | 3 | 3 | 2 | 2 |
| TiI₄ (millimole) | 0.3 | 0.2 | 0.1 | Nil |
| Li/Ti (mole/mole) | 10 | 15 | 20 | |
| Yield (percent) | 95 | 95 | 98 | 90 |
| Mooney viscosity (ML–4–100° C.) | 51 | 32.5 | 47 | 17 |
| Intrinsic viscosity (dl./g.) | 1.95 | 1.72 | 2.24 | 1.78 |

Bottle No. 4 is a control experiment to show results obtained when the titanium halide is not used.

Polymers produced in bottles 1–3 were solid gel-free rubbery materials which retained their shape when stored on shelf at room temperature for three weeks. Bottle 4 (control) produced a polymer which showed a pronounced tendency to cold flow and had a low Mooney viscosity, although the intrinsic viscosity was approximately the same as that of bottle 2.

The polymer of bottle 3 was checked for microstructure and showed 30.1% of the units in the cis-1,4, 55.0% in the trans-1,4 and 14.9% in the 1,2 configuration.

EXAMPLE II

Butadiene-1,3 and styrene were copolymerized in 30 oz. bottles in the presence of a catalyst containing 10 moles of n-butyl lithium per mole of TiCl₃I. The polymerization recipe was as follows:

Benzene (milliliters at 20° C.) _____ 250
Styrene (milliliters at 20° C.) _____ 20
Liquid butadiene (milliliters at 20° C.) _____ 125
TiCl₃I (millimole) _____ 0.2
n-butyl lithium (millimole) _____ 2.0

The ingredients were charged in the order as shown and polymerization was carried out at room temperature for six hours. An essentially quantitative conversion of monomers to polymer was obtained. The copolymer which was recovered in a manner described in Example I showed a Mooney viscosity of 102, an intrinsic viscosity of 2.89 dl./g. The butadiene-1,3 units present in the copolymer showed the following microstructure:

|  | Percent |
|---|---|
| Cis-1,4 | 34.6 |
| Trans-1,4 | 53.4 |
| Vinyl (1,2) | 12.0 |

The copolymer contained 19% by weight of styrene units which appeared to be randomly distributed along the chain.

EXAMPLE III 125 milliliters of liquid butadiene-1,3 was polymerized in the presence of 450 milliliters of benzene using as the catalyst a mixture of 2.0 millimoles of butyl lithium and 0.2 millimoles of titanium tetrachloride. The polymerization was carried out at room temperature in 30 oz. crown capped bottles according to the procedure of Example I. A 75% conversion of the monomer to polymer was obtained in 6 hours. The product showed a Mooney viscosity of 50 and intrinsic viscosity of 2.22 and essentially retained its original shape, when shelf-stored for three weeks at about 25° C. A polymerization experiment carried out for comparison in the absence of TiCl₄ resulted in a high yield of a flowable polymer of a low Mooney viscosity.

EXAMPLE IV

Butadiene-1,3 was polymerized in 7 oz. crown capped bottles using a catalyst consisting of n-butyl lithium and titanium trichloromonoiodide. Six bottles were charged each with 50 milliliters of benzene, 20 milliliters of liquid butadiene, 0.1 millimole of n-butyl lithium and varying amount of $TiCl_3I$. Polymerization was carried out at room temperature for 6 hours and products were recovered as described in Example I. The results are shown in Table II.

TABLE II

| Bottle No | 1 | 2 | 3 | 4 | 5 | 6 |
|---|---|---|---|---|---|---|
| $TiCl_3I$ (Millimoles) | 0.03 | 0.05 | 0.07 | 0.10 | 0.13 | 0.20 |
| Li/Ti ratio (mole/mole) | 33 | 20 | 14 | 10 | 8 | 5 |
| Yield (percent) | 75 | 85 | 92 | 95 | 90 | 65 |
| Microstructure of Polymer: | | | | | | |
| Cis-1,4 | 34.9 | 35.6 | 36.2 | 34.5 | 35.9 | 37.3 |
| Trans-1,4 | 53.4 | 52.0 | 51.6 | 52.8 | 51.6 | 48.2 |
| 1,2 | 11.7 | 12.4 | 12.2 | 12.7 | 12.5 | 14.5 |

The above table shows that the microstructure of polybutadiene does not significantly vary at a molar ratio of lithium to titanium in the catalyst varying between 5:1 and 33:1. At a ratio below 5:1 the yield is greatly reduced and the microstructure changes to a high cis-1,4.

EXAMPLE V

The polymerization experiments in the presence of the butyl lithium-titanium trichloromonoiodide catalyst were repeated in 30 oz. bottles using the following recipe: 300 milliliters of benzene, 120 milliliters of butadiene-1,3 and variable amounts of the catalyst components. The results are shown in Table III.

TABLE III

| Bottle No | 1 | 2 | 3 | 4 |
|---|---|---|---|---|
| n-BuLi (millimole) | 2.5 | 2.5 | 2.5 | 2.2 |
| $TiCl_3I$ (millimole) | 0.25 | 0.25 | 0.3 | 0.3 |
| Li/Ti ratio (mole/mole) | 12 | 10 | 8 | 7 |
| Yield in 16 hrs. at r.t. (percent) | 90 | 100 | 96 | 96 |
| Mooney viscosity (ML-4-100° C.) | 18 | 27 | 45 | 67.5 |
| Intrinsic viscosity (dl./g.) | 1.53 | 1.56 | 1.82 | 2.24 |
| Solubility in toluene (percent) | 96 | 99 | 100 | 100 |
| Tendency to cold flow | (¹) | (²) | (²) | (²) |
| Cis-1,4 structure | (³) | (³) | 38.9 | 37.3 |
| 1,2 structure | (³) | (³) | 10.7 | 12.5 |
| Trans-1,4 structure | (³) | (³) | 50.4 | 50.2 |

¹ Yes.
² No.
³ Not tested.

Bottle 2 was repeated with n-butyl lithium replaced by tertiary butyl lithium. A yield of 96% was obtained and the polymer was hydrocarbon soluble having a Mooney viscosity of 38 and an intrinsic viscosity of 1.85 dl./gm.

According to the above results, the molecular weight of butadiene polymer increases as the ratio of lithium to titanium is decreased. The table also shows that polymers having a Mooney viscosity of 27 or above retain their shape when stored at room temperature.

EXAMPLE VI 75 gms. of butadiene-1,3 was polymerized according to the procedure of Example I in the presence of 280 milliliters of benzene, 2.5 millimoles of butyl lithium and 0.13 millimole of a 1:1 mixture of $TiI_4$ and $TiCl_4$. 75 gms. of a solid non-cold flowing polymer was obtained in 16 hours reaction at room temperature. The polymer showed a Mooney viscosity of 60 and an intrinsic viscosity of 2.29 dl./g. The microstructure of the polymer was 33.4% cis-1,4; 53.0% trans-1,4; and 13.6% 1,2.

EXAMPLE VII 62 gms. of butadiene-1,3 was polymerized according to the procedure of Example I in the presence of 400 milliliters of n-hexane using a catalyst consisting of 3.5 millimoles of butyl lithium and 0.25 millimoles of $TiCl_3I$. 60 gms. of a solid non-flowable polymer was obtained in 16 hours at room temperature. It showed a Mooney viscosity of 28.5 and an intrinsic viscosity of 1.80 and had 36.3% of the butadiene units in the cis-1,4 configuration, 54.0% in the trans-1,4 and 9.7% in the 1,2 structure.

A control bottle polymerized in the absence of $TiCl_3I$ produced a liquid polybutadiene having an intrinsic viscosity of 0.70 and the following microstructure: 34.8% cis-1,4, 55.1% trans-1,4 and 10.1% of the 1,2 content.

EXAMPLE VIII

The effect of various polar compounds on the activity of the butyl lithium-titanium trichloromoiodide catalyst was investigated. The experiments with methyl iodide and diethyl ether were carried out in 30 oz. polymerization bottles and those with triethyl amine in 7 oz. bottles. The bottles were charged and polymers were recovered as described in Example I. The recipes and test data are presented in Table V.

Table IV shows that the polymerization of butadiene-1,3 carried out in the presence of a small amount of polar additives such as diethyl ether, triethyl amine or methyl iodide produces a non-flowable polymer containing less than 25% of the 1,2 structure.

The polymer of Bottle 3 was dissolved in toluene and solution viscosity was measured using a Brookfield LVT model viscometer. The measurements were carried out at different shear rates and extra-polated to zero shear rate ($\eta_0$) for concentrations ranging from about 10 to 30% polymer content. Similar measurements were carried out on solutions in toluene of control polymers, linear polybutadiene and butadiene-divinyl benzene copolymer, both prepared in the presence of butyl lithium. The logarithms of the viscosity $\eta_0$ and the concentration of the polymer solutions are tabulated in Table V.

TABLE IV

| | Bottle Number | | | | | |
|---|---|---|---|---|---|---|
| | 1 | 2 | 3 ¹ | 4 | 5 | 6 |
| | Additive | | | | | |
| | Diethyl ether | | Methyl iodide | | Triethyl amine | |
| Recipe: | | | | | | |
| Benzene (mls.) | 450 | 450 | 300 | 300 | 50 | 50 |
| Butadiene (mls.) | 125 | 125 | 100 | 150 | 20 | 20 |
| n-BuLi (millimoles) | 2.0 | 2.0 | 2.5 | 2.0 | 0.8 | 0.8 |
| $TiCl_4$ (millimoles) | 0.15 | 0.25 | 0.2 | 0.25 | 0.05 | ² 0.08 |
| Additive (millimoles) | 1.9 | 1.9 | 0.2 | 0.5 | 0.5 | 0.5 |
| Li/Ti (mole/mole) | 13 | 8 | 12.5 | 8.0 | 16.9 | 10.0 |
| Additive/Li (mole/mole) | .95 | .95 | 0.08 | 0.25 | 0.63 | 0.63 |
| Yield in 16 hrs. at r.t. (percent) | 93 | 62 | 100 | 85 | 98 | 91 |
| Test Data: | | | | | | |
| Mooney (ML-4-100° C.) | 57.5 | 89 | 26 | 46.5 | (³) | (³) |
| Intrinsic viscosity (dl./g.) | 2.10 | 2.67 | 1.35 | 1.90 | 2.26 | 1.78 |
| Cis-1,4 content (percent) | 31.7 | 32.6 | 34.3 | 34.0 | 26.9 | (³) |
| Trans-1,4 content (percent) | 49.5 | 47.9 | 53.1 | 57.5 | 48.8 | (³) |
| 1,2 content (percent) | 18.8 | 19.5 | 12.6 | 14.5 | 24.3 | (³) |
| Cold flow | (⁴) | (⁴) | (⁴) | (⁴) | (⁴) | (⁴) |

¹ Polymerized at 40° C., all others at about 20° C.
² $TiCl_3I$ used instead of $TiCl_4$.
³ Not tested.
⁴ No.

TABLE V

| Log $\eta_0$ | Bottle 3 | Log $W$ (polymer concentration) Polybutadiene Control | Log $W$ (polymer concentration) Bd-DVB Copolymer |
|---|---|---|---|
| 3.90 | (¹) | 1.43 | 1.52 |
| 3.01 | 1.50 | 1.37 | 1.38 |
| 2.54 | 1.44 | 1.26 | 1.30 |
| 1.93 | 1.34 | 1.14 | 1.19 |
| 1.51 | 1.26 | 1.07 | 1.11 |
| 0.93 | 1.15 | 0.95 | 0.99 |
| 0.71 | 1.10 | 0.90 | 0.94 |
| $\alpha$ (calculated) | 0.58 | 0.71 | 0.58 |

¹ Not measured.

It is evident from the above table that the solution viscosity of the bottle 3 polymer is markedly lower than those of control polymers at a given concentration.

The viscosity of concentrated polymer solution $\eta_0$ was assumed to be proportional to the B/α power of the weight fraction W of the polymer having the molecular weight M according to the empirical equation:

$$\log \eta_0 = A + B/\alpha \log W + B \log M$$

where A is a constant, B equals 3.4 for high molecular weight polymers and α is the exponent in the empirical equation of Mark and Houwink relating intrinsic viscosity [η] and molecular weight $[\eta] = KM\alpha$. Data of Table V were plotted on a graph: log $\eta_0$ vs. Log $W$ (concentration) and the value of α was calculated from the slope of the line. The values calculated for the polymer of this invention (bottle 3) and the control polymers are given in the last line of Table V. The α value of bottle 3 is equal to that of the branched slightly crosslinked butadiene-divinyl benzene copolymer and considerably lower than the α value of linear polybutadiene.

EXAMPLE IX

In order to demonstrate a difference in the cold flow properties of the polybutadiene of this invention and polybutadienes of the prior art, three polymer samples were prepared using a recipe similar to that shown in Example V. The Mooney viscosity of the samples was 39, 32.5 and 26.5, respectively. A cylindrical pellet of 19 mm. diameter and 16.5 mm. high was moulded of each of the samples and pinned to a board. The board was inclined at a 45° angle and the pellets were allowed to flow. Pellets of a polybutadiene prepared in the presence of butyl lithium as the sole catalyst component and a branched, slightly crosslinked copolymer of butadiene and divinyl benzene (0.1% by wt. based on the weight of butadiene) were used as controls. The results are shown in Table VI.

TABLE VI

| Polymer Sample No. | 1 | 2 | 3 | Control A | Control B |
|---|---|---|---|---|---|
| Mooney (ML-4-100° C.) | 39 | 32.5 | 26.5 | 35 | 31 |
| Flow (millimeters): | | | | | |
| After 3 days at 20° C | 0.0 | 0.0 | 0.0 | 0.0 | 57.0 |
| After 12 days at 20° C | 2.5 | 3.8 | 5.0 | 12.5 | (¹) |
| After 28 days at 20° C | 6.5 | 16.5 | 20.5 | 28.0 | (¹) |

¹ Not measured.
NOTE.—Control A Butadiene=DVB copolymer; Control B polybutadiene prepared in the presence of butyl lithium.

The flow characteristics of the polymer of this invention was also determined using a pressure extrusion method. A brass block having a vertical cylindrical cavity of a 19 mm. diameter and about 25 mm. deep was used for this determination. At the base of the cavity a 3 mm. diameter horizontal opening was provided in the wall of the block. A polymer pellet, 19 mm. in diameter and 16.5 mm. high was placed in the cavity and pressured by means of a piston weighted with a 5-lb. weight. The polymer was caused to flow through the horizontal opening and the amount of the polymer that has been collected at the face of the opening in a specified time at room temperature was used as a numerical value of the polymer tendency to cold flow. The results are shown in Table VII.

TABLE VII

| Polymer Sample | 4 | Control A | Control B |
|---|---|---|---|
| Mooney (ML-4-100° C.) | 34.5 | 35 | 31 |
| Flow (gms.): | | | |
| In 3 days at 20° C | 0.0 | 0.04 | 2.44 |
| In 12 days at 20° C | 0.04 | 0.13 | (¹) |
| In 28 days at 20° C | 0.12 | 0.27 | (¹) |

¹ Not measured.

Sample 4 was prepared in the presence of a catalyst consisting of a mixture of 12 moles of butyl lithium and 1 mole TiCl₃I. Controls A and B are as in Table VI.

Tables VI and VII show that polybutadiene samples prepared in the presence of butyl lithium and titanium trichloromonoiodide are considerably better with respect to cold flow than polybutadiene prepared in the presence of butyl lithium (Control B). They even appear to flow slightly less than the branched copolymer of butadiene and divinyl benzene (Control A). This slow flow suggests that the polymers of this invention are at least as branched as the butadiene copolymer containing about 0.1% of divinyl benzene.

EXAMPLE X

Sample No. 1 of Example VIII was blended with natural rubber in a ratio of 4:1. The blend having a Mooney viscosity (RP ML-4-100° C.) of 36 was compounded on a 6" x 12" laboratory mill with the following ingredients (in parts by weight on 100 parts of the blend):

| | |
|---|---|
| Polymer blend | 100 |
| High abrasion furnace (HAF) black | 50 |
| 48% aromatics petroleum oil of S.G. 0.95 | 10 |
| Stearic acid | 1.0 |
| Zinc oxide | 3.0 |

The milling behaviour of the compound was observed and comments on the cohesion, adhesion to rolls, acceptance of block were recorded. The following vulcanization agents were then added (in parts/100 parts of polymer blend):

| | |
|---|---|
| N-cyclohexyl-2-benzothiazole sulphenamide | 1.1 |
| Sulphur | 1.4 | and worked by milling into the compound. The Mooney viscosity of the compound (CP-ML-4-100° C.) was determined next and a part of the compound was subjected to extrusion tests using a Royle Extruder Model ½ equipped with a Garvey Die. Another part of the compound was press moulded, vulcanized at 145° C. for 50 minutes, and the vulcanizates were tested for stress-strain properties. Similar compounds were also prepared from 4:1 blends with natural rubber of control polymers, linear polybutadiene and branched copolymer of butadiene and divinyl benzene (0.1%) both prepared in the presence of lithium catalyst. Since these control blends were poorly processable, another series of blends was prepared in which the proportion of butadiene polymers to natural rubber was reduced to 3:2. The second series of blends was compounded, vulcanized and tested as was the first series of blends. The results are shown in Table VIII.

TABLE VIII

| Polymer Type | Compound | | | | | |
|---|---|---|---|---|---|---|
| | 1 | 2 | 3 | 4 | 5 | 6 |
| | Butadiene polymer/Nat. rubber, blend ratio | | | | | |
| | 4:1 | | | 3:2 | | |
| | Sample 1 of Ex. IX | Control B | Control A | Sample 1 of Ex. IX | Control A | Control B |
| Raw polymer Mooney (ML-4-100° C.) | 36 | 38.5 | 34.5 | 41.5 | 50.5 | 44.0. |
| Compound Mooney (ML-4-100° C.) | 51.5 | 74.5 | 55.5 | Good | Fair | Fair. |
| Milling Behaviour | Fair | Poor | Poor | Normal | Weak | Weak. |
| Adhesion to the roll | Weak | None | None | Dull holes present | Dull | Dull. |
| Appearance of the sheet | Dull-shiny | Dull holes present | Dull holes present | Dull-shiny | Dull | Dull. |
| Extrusion Rate (gms./min.) | 114 | 91 | 108 | 116 | 96 | 125. |
| Vulcanizate Properties (vulcanized 50 min. at 145° C.): | | | | | | |
| Tensile Strength (kg./cm.²) | 167 | 149 | 150 | 194 | 138 | 177. |
| Elongation (percent) | 420 | 390 | 390 | 450 | 350 | 430. |
| 300% Modulus (kg./cm.²) | 92 | 95 | 87 | 99 | 103 | 98. |
| Shore Hardness (A-2 units) | 54 | 60 | 55 | 55 | 57 | 57. |
| Ball Rebound (percent at 100° C.) | 68.0 | 73.1 | 70.5 | 70.5 | 73.1 | 68.0. |

Table VIII shows that Sample I of Example IX, that is the polybutadiene prepared in the presence of butyl lithium and titanium trichloromonoiodide was better processable than either of the two controls used. When blended with natural rubber in a ratio of 4:1, it could be milled without manual feeding, showed a compound Mooney viscosity of 51.5 (15 Mooney points above the raw polymer Mooney) and a high extrusion rate. Polybutadiene made in the presence of butyl lithium (Control B) was poorly millable, had to be manually fed into the nip of the mill, fell off the rolls, showed an increase of 36 points in Mooney viscosity on the addition of compounding ingredients to 74.5, and extruded slower than the first compound. The butadiene-divinyl benzene copolymer (Control A) appeared to be intermediate with respect to the processability and somewhat closer to the branched polybutadiene (Compound 1) than to the linear one. A higher proportion of natural rubber in the blend improved the processability of Compound 4 to a level at which no difficulties could be expected in a commercial equipment whereas both controls were not completely satisfactory.

Table VIII further shows that the physical properties of Compounds 1 and 4 are at least as good as those of control polymers.

What is claimed is:

1. In a process of polymerizing butadiene-1,3-to produce a rubbery polymer having less than 25% of the butadiene units in the 1,2 structure, between about 25 and 40% in the cis-1,4 configuration and the remainder of said units being in the trans-1,4 configuration, which process comprises contacting butadiene-1,3 with a lithium catalyst, an improvement which comprises adding to the catalyst a titanium tetrahalide, the molar ratio of lithium to titanium in the catalyst being from 8:1 to 16:1.

2. The process according to claim 1 in which the lithium component is a lithium hydrocarbon containing 1-12 carbon atoms.

3. The process according to claim 1 in which butadiene-1,3 is contacted with said catalyst in the presence of a non-reactive liquid hydrocarbon containing 1-10 carbon atoms.

4. The process according to claim 3 in which butadiene-1,3 is contacted with said catalyst also in the presence of an organic polar compound selected from the group consisting of ethers, tertiary amines and hydrocarbyl halides, said polar compound containing less than 12 carbon atoms and being present in an amount less than 1 mole per mole of lithium hydrocarbon in said catalyst.

5. The process according to claim 3 in which butadiene-1,3 is polymerized at a temperature between 0 and 70° C.

6. The process according to claim 5 in which butadiene-1,3 and not more than 25%, by weight of said butadiene-1,3, of styrene are contacted with the polymerization catalyst.

7. A process of producing a substantially gel-free homopolymer of butadiene having less than 25% of the butadiene units in the 1,2 structure, between about 25 and 40% in the cis-1,4 configuration and the remainder of said units being in the trans-1,4 configuration, which comprises contacting at a temperature of 0 to 70° C. in the presence of a hydrocarbon diluent butadiene-1,3 with a polymerization catalyst formed by admixing a lithium hydrocarbon containing 1-12 carbon atoms and a titanium tetrahalide, the molar ratio of lithium to titanium in said catalyst being between 8:1 and 16:1.

8. The process according to claim 6 in which the lithium hydrocarbon is an alkyl lithium containing 2-8 carbon atoms.

9. The process according to claim 7 in which titanium tetrahalide is titanium tetraiodide.

10. The process according to claim 3 in which the non-reactive liquid hydrocarbon is benzene present in an amount of 1-10 volumes per one volume of butadiene-1,3.

11. The process according to claim 7 in which titanium tetrahalide is titanium trichloromonoiodide.

References Cited

UNITED STATES PATENTS

| 3,329,666 | 7/1967 | Stearns | 260—94.2 |
| 3,254,069 | 5/1966 | Johnson | 260—94.3 |
| 3,275,614 | 9/1966 | Pampus, et al. | 260—94.3 |
| 3,317,918 | 5/1967 | Foster | 260—83.7 |

FOREIGN PATENTS 931,579  7/1963  Great Britain.

JOSEPH L. SCHOFER, *Primary Examiner.*

R. A. CAITHER, *Assistant Examiner.*

U.S. Cl. X.R.

260—84.1, 94.2

UNITED STATES PATENT OFFICE
CERTIFICATE OF CORRECTION

Patent No. 3,429,863  February 25, 1969

Yung-Kang Wei

It is certified that error appears in the above identified patent and that said Letters Patent are hereby corrected as shown below:

Column 2, line 8, after "tetravalent" insert -- titanium --. Column 4, lines 22 and 23, cancel "The presence of branches.". Column 7, TABLE III, second column, line 1 thereof, "2.5" should read -- 3.0 --.

Signed and sealed this 24th day of March 1970.

(SEAL)
Attest:

Edward M. Fletcher, Jr.

Attesting Officer

WILLIAM E. SCHUYLER, JR.

Commissioner of Patents